US009996934B2

United States Patent
Mate et al.

(10) Patent No.: US 9,996,934 B2
(45) Date of Patent: Jun. 12, 2018

(54) DEVICE WITH AN ADAPTIVE CAMERA ARRAY

(71) Applicant: Nokia Technologies Oy, Espoo (FI)

(72) Inventors: Sujeet Shyamsundar Mate, Tampere (FI); Jussi Leppanen, Tampere (FI); Junsheng Fu, Tampere (FI); Pouria Babahajiani, Tampere (FI)

(73) Assignee: Nokia Technologies Oy, Espoo (FI)

( * ) Notice: Subject to any disclaimer, the term of this patent is extended or adjusted under 35 U.S.C. 154(b) by 277 days.

(21) Appl. No.: 15/050,038

(22) Filed: Feb. 22, 2016

(65) Prior Publication Data

US 2016/0248985 A1    Aug. 25, 2016

(30) Foreign Application Priority Data

Feb. 24, 2015    (GB) .................................. 1503015.8

(51) Int. Cl.
| | |
|---|---|
| *H04N 7/00* | (2011.01) |
| *G06T 7/00* | (2017.01) |
| *H04N 5/247* | (2006.01) |
| *H04N 5/232* | (2006.01) |
| *G06K 9/52* | (2006.01) |

(Continued)

(52) U.S. Cl.
CPC .............. *G06T 7/0065* (2013.01); *G03B 37/04* (2013.01); *G06K 9/52* (2013.01); *G06T 7/593* (2017.01); *G06T 7/85* (2017.01); *H04N 5/2258* (2013.01); *H04N 5/23238* (2013.01); *H04N 5/247* (2013.01)

(58) Field of Classification Search
CPC .............. G06T 7/0065; H04N 5/23296; H04N 5/2258; G03B 37/04
See application file for complete search history.

(56) References Cited

U.S. PATENT DOCUMENTS

| | | |
|---|---|---|
| 2003/0071896 A1 | 4/2003 | Hunter |
| 2003/0229735 A1 | 12/2003 | Sorokin et al. |

(Continued)

FOREIGN PATENT DOCUMENTS

| | | |
|---|---|---|
| CN | 1298607 A | 6/2001 |
| CN | 101930162 A | 12/2010 |

(Continued)

OTHER PUBLICATIONS

Office action received for corresponding Chinese Patent Application No. 201610094231.2, dated Dec. 4, 2017, 05 pages of office action and no page of translation available.

Kanhere et al., "Reconfigurable Micro-Camera Array With Panoramic Vision for Surgical Imaging", Journal of Microelectromechanical Systems, vol. 22, No. 5, Oct. 2013, pp. 989-991.

(Continued)

*Primary Examiner* — Sathyanaraya V Perungavoor
*Assistant Examiner* — Peet Dhillon
(74) *Attorney, Agent, or Firm* — Nokia Technologies Oy

(57) ABSTRACT

The invention relates to a method comprising obtaining a desired field of view (FOV) for an image arranged to be captured, determining a required field of view (r_fov) of the FOV for each active camera sensor of a camera array having a field of view (fov), comparing the r_fov and the fov, and determining a bend angle between adjacent camera sensors to achieve the FOV by camera sensors of the camera sensor array, if the r_fov is less than or equal to the fov. The invention further relates to an apparatus, a system and a computer program product that perform the method.

18 Claims, 8 Drawing Sheets

(51) Int. Cl.
*G03B 37/04* (2006.01)
*H04N 5/225* (2006.01)
*G06T 7/80* (2017.01)
*G06T 7/593* (2017.01)

(56) References Cited

U.S. PATENT DOCUMENTS

| | | |
|---|---|---|
| 2010/0007714 A1 | 1/2010 | Kim et al. |
| 2010/0289881 A1 | 11/2010 | Xu |
| 2013/0044240 A1 | 2/2013 | Leskela et al. |
| 2014/0055621 A1 | 2/2014 | Shirani et al. |
| 2014/0132735 A1 | 5/2014 | Lee et al. |
| 2014/0285618 A1* | 9/2014 | Cho ............... H04N 5/2258 348/38 |

FOREIGN PATENT DOCUMENTS

| | | |
|---|---|---|
| CN | 102150126 A | 8/2011 |
| CN | 104157660 A | 11/2014 |
| EP | 2405645 A2 | 1/2012 |
| JP | 2006-080580 A | 3/2006 |
| JP | 2012-159616 A | 8/2012 |
| JP | 2013-045032 A | 3/2013 |
| WO | 1999/052288 A1 | 10/1999 |
| WO | 2013/120200 A1 | 8/2013 |
| WO | 2014/062481 A1 | 4/2014 |

OTHER PUBLICATIONS

"Flexible Camera Array Could Lead Towards Panoramic Photos That Don't Suck", Extremetech, Retrieved on May 24, 2016, Webpage available at : http://www.extremetech.com/extreme/164263-flexible-camera-array-could-lead-towards-panoramic-photos-that-dont-suck.

"Ball Camera Takes Spherical Panoramas", Technology Review, Retrieved on May 24, 2016, Webpage available at : https://www.technologyreview.com/s/425814/ball-camera-takes-spherical-panoramas/.

Zhang et al., "A Self-Reconfigurable Camera Array", Eurographics Symposium on Rendering, 2004, 12 pages.

Nomura et al., "Scene Collages and Flexible Camera Arrays", Proceedings of the 18th Eurographics conference on Rendering Techniques, 2007, 12 pages.

Search Report received for corresponding United Kingdom Patent Application No. 1503015.8, dated Aug. 21, 2015, 4 pages.

Extended European Search Report received for corresponding European Patent Application No. 16155428.2, dated Jun. 30, 2016, 11 pages.

Office action received for corresponding Japanese Patent Application No. 2016-025468, dated May 10, 2017, 6 pages of office action and no page of translation available.

Office action received for corresponding Chinese Patent Application No. 201610094231.2, dated Jun. 2, 2017, 13 pages of office action and no page of translation available.

\* cited by examiner

DEVICE WITH AN ADAPTIVE CAMERA ARRAY

BACKGROUND

Today, mobile phones and other portable electronic devices offer users a wide range of applications relating to imaging. Mobile devices with camera are used for different types of imaging, for example, for regular imaging with different resolution, different field imaging, video imaging etc. Imaging type may depend on the use of images, the object of images and the used application, camera or device. Increased data transmission and a need of easy use of devices sets their own demands for devices and applications used for imaging.

SUMMARY

Various embodiments of the invention include a method, an apparatus, a system and a computer readable medium comprising a computer program stored therein, which are characterized by what is stated in the independent claims. Various embodiments of the invention are disclosed in the dependent claims.

According to a first aspect, there is provided a method, comprising obtaining a desired field of view (FOV) for an image arranged to be captured, determining a required field of view (r_fov) of the desired field of view (FOV) for each active camera sensor of a camera array comprising at least two active camera sensors having a field of view (fov), wherein the required field of view is determined by dividing the desired field of view (FOV) by the number of active camera sensors, comparing the field of view (r_fov) and the field of view (fov) of camera sensors and determining a bend angle between adjacent camera sensors to achieve the desired field of view (FOV) by camera sensors of the camera sensor array, if the required field of view (r_fov) less than or equal to the field of view (fov).

According to an embodiment, the method further comprises bending the camera array automatically to obtain the determined bend angle between adjacent camera sensors in the array. According to an embodiment, the method further comprise activating at least one additional camera sensor, if required field of view (r_fov) is greater than field of view (fov) of camera sensors, performing determining and comparing steps on the basis of currently active camera sensors. According to an embodiment, said at least one camera sensor is activated automatically by turning said at least one camera ON in the camera array. According to an embodiment, the desired field of view (FOV) is obtained as a user input. According to an embodiment, the desired field of view (FOV) is a wide angle view. According to an embodiment, the camera array is flexible. According to an embodiment, the image is a still image. According to an embodiment, the image is video image data.

According to a second aspect, there is provided an apparatus comprising a flexible camera array comprising at least two active camera sensors having a field of view (fov), at least one processor, memory including computer program code, the memory and the computer program code configured to, with the at least one processor, cause the apparatus to perform at least the following obtain a desired field of view (FOV) for an image arranged to be captured by said at least two active camera sensors, determine a required field of view (r_fov) of the desired field of view (FOV) for each active camera, wherein the required field of view is determined by dividing the desired field of view (FOV) by the number of active camera sensors, compare the field of view (r_fov) and the field of view (fov) and determine a bend angle between adjacent camera sensors to achieve the desired field of view (FOV) by camera sensors of the camera sensor array, if the required field of view (r_fov)<=the field of view (fov).

According to an embodiment, the apparatus is further caused to bend the camera array automatically to obtain the determined bend angle between adjacent camera sensors in the array. According to an embodiment, the apparatus is further caused to activate at least one camera sensors, if required field of view (r_fov)>field of view (fov) of camera sensors, and perform determining and comparing steps on the basis of currently activate camera sensors. According to an embodiment, said at least one camera sensor is activated automatically by turning said at least one camera on in the camera array. According to an embodiment, the desired field of view (FOV) is obtained as a user input. According to an embodiment, the desired field of view (FOV) is a wide angle view. According to an embodiment, the camera array is flexible. According to an embodiment, the apparatus is a mobile device.

According to a third aspect, there is provided a system comprising a mobile device, a flexible camera array connected to the mobile device, at least one processor, memory including computer program code, the memory and the computer program code configured to, with the at least one processor, cause the system to perform at least the following obtain a desired field of view (FOV) for an image arranged to be captured by said at least two active camera sensors, determine a required field of view (r_fov) of the desired field of view (FOV) for each active camera, wherein the required field of view is determined by dividing the desired field of view (FOV) by the number of active camera sensors, compare the field of view (r_fov) and the field of view (fov) and determine a bend angle between adjacent camera sensors to achieve the desired field of view (FOV) by camera sensors of the camera sensor array, if the required field of view (r_fov)<=the field of view (fov).

According to an embodiment, the system is further caused to bend the camera array automatically to obtain the determined bend angle between adjacent camera sensors in the array. According to an embodiment, the system is further caused to activate at least one camera sensors, if required field of view (r_fov)>field of view (fov) of camera sensors, and perform determining and comparing steps on the basis of currently activate camera sensors. According to an embodiment, said at least one camera sensor is activated automatically by turning said at least one camera on in the camera array. According to an embodiment, the desired field of view (FOV) is obtained as a user input. According to an embodiment, the desired field of view (FOV) is a wide angle view. According to an embodiment, the camera array is a gorillapod device.

According to a fourth aspect, there is provided an apparatus comprising means for obtain a desired field of view (FOV) for an image arranged to be captured, means for determine a required field of view (r_fov) of the desired field of view (FOV) for each active camera sensor of a camera array comprising at least two active camera sensors having a field of view (fov), wherein the required field of view is determined by dividing the desired field of view (FOV) by the number of active camera sensors, means for compare the field of view (r_fov) and the field of view (fov) of camera sensors and means for determine a bend angle between adjacent camera sensors to achieve the desired field of view (FOV) by camera sensors of the camera sensor array, if the required field of view (r_fov) less than or equal to the field of view (fov).

According to a fifth aspect, there is provided a computer program product embodied on a non-transitory computer readable medium, comprising computer program code configured to, when executed on at least one processor, cause an apparatus to obtain a desired field of view (FOV) for an image arranged to be captured by said at least two active camera sensors, determine a required field of view (r_fov) of the desired field of view (FOV) for each active camera, wherein the required field of view is determined by dividing the desired field of view (FOV) by the number of active camera sensors, compare the field of view (r_fov) and the field of view (fov) and determine a bend angle between adjacent camera sensors to achieve the desired field of view (FOV) by camera sensors of the camera sensor array, if the required field of view (r_fov)<=the field of view (fov).

According to an embodiment, the apparatus is further caused to bend the camera array automatically to obtain the determined bend angle between adjacent camera sensors in the array. According to an embodiment, wherein the apparatus is further caused to activate at least one camera sensors, if required field of view (r_fov)>field of view (fov) of camera sensors, and perform determining and comparing steps on the basis of currently activate camera sensors. According to an embodiment, said at least one camera sensor is activated automatically by turning said at least one camera on in the camera array. According to an embodiment, the desired field of view (FOV) is obtained as a user input. According to an embodiment, the desired field of view (FOV) is a wide angle view. According to an embodiment, the camera array is flexible. According to an embodiment, the apparatus is a mobile device.

According to a sixth aspect, there is provided a method comprising capturing an image of an object by each camera of a camera array simultaneously, estimating the depth and the size of the object, selecting a part of the cameras to be active for imaging, computing the minimum depth (t) for active cameras, activating at least one more camera to be active, if depth of the object is greater than minimum depth (t) for active cameras.

According to an embodiment, the selected part of active cameras are one camera of both ends of the camera array.

According to a seventh aspect, there is provided an apparatus comprising a camera array comprising at least two active camera sensors having a field of view (fov), at least one processor, memory including computer program code, the memory and the computer program code configured to, with the at least one processor, cause the apparatus to perform at least the following capture an image of an object by each active camera of the camera array simultaneously, estimate the depth and the size of the object, select a part of the cameras to be active for imaging, compute the minimum depth (t) for active cameras and activate at least one more camera to be active, if depth of the object is greater than minimum depth (t) for active cameras.

According to a eighth aspect, there is provided a system comprising a mobile device, a camera array connected to the mobile device, at least one processor, memory including computer program code, the memory and the computer program code configured to, with the at least one processor, cause the system to perform at least the following capture an image of an object by each active camera of the camera array simultaneously, estimate the depth and the size of the object, select a part of the cameras to be active for imaging, compute the minimum depth (t) for active cameras, and activate at least one more camera to be active, if depth of the object is greater than minimum depth (t) for active cameras.

According to a ninth aspect, there is provided computer program product embodied on a non-transitory computer readable medium, comprising computer program code configured to, when executed on at least one processor, cause an apparatus to capture an image of an object by each active camera of the camera array simultaneously, estimate the depth and the size of the object, select a part of the cameras to be active for imaging, compute the minimum depth (t) for active cameras and activate at least one more camera to be active, if depth of the object is greater than minimum depth (t) for active cameras.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of FIGS. 1 to 11. It is to be noted, however, that the invention is not limited to shown embodiments. In fact, the different embodiments have applications in any environment where a mobile device with an adaptive camera array is required. The camera array may be a separate camera array device that is arranged to be connected to a mobile, thus forming a system. Alternatively an adaptive camera array may be a part of a mobile device i.e. the mobile device comprises the adaptive camera array. The adaptive camera array may adapt automatically. Adapting of a camera array may in this context mean that different bent angles may be formed between adjacent cameras for capturing desired content with different field of views. This means that bent angles between cameras depend on the desired field of view, for example, the wider field of view the bigger the bent angle. Adaptive may also mean that the camera array may comprise both activate and/or inactivate cameras depending on the imaging object or distance (depth) to the object, and state of cameras may be changed from active to inactive and vice versa when needed.

Figure 1:
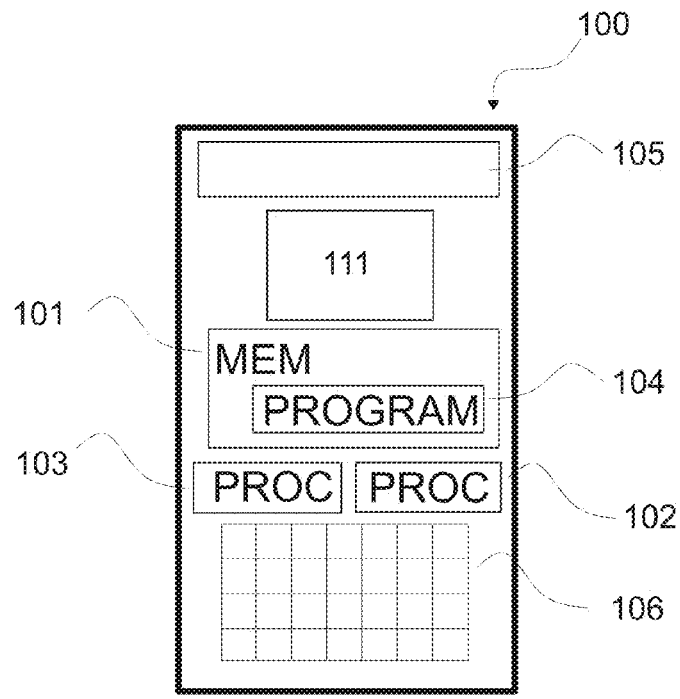
FIG. 1 shows an apparatus according to an example embodiment.

FIG. 1 shows an apparatus according to an example embodiment. The apparatus 100 is a mobile device containing required electronics and circuitry, for example, for performing a camera pose determining method, size and depth determining method or a required number of cameras determining method according to embodiments of the invention. The above mentioned methods are implemented as an additional function for the apparatus 100. It should be understood, however, that the apparatus 100 as illustrated and hereinafter described is merely illustrative of one type of device that may benefit from various embodiments, and therefore should not be taken to limit the scope of the embodiments. As such, it should be appreciated that at least some of the components described below in connection with the apparatus 100 may be optional and thus, in an example embodiment may include more, less or different components than those described in connection with the example embodiment of FIG. 1.

The apparatus 100 comprises a memory 101, at least one processor 102 and 103, and computer program code 104 residing in the memory 101. The apparatus 100 further comprises several image capturing means such as image sensors, for example, cameras, which are arranged to capture viewfinder frames i.e. image frames i.e. images. In this example embodiment the apparatus 100 comprises at least two cameras (not shown) forming an adaptive camera array 105. However, there may be, for example, 2, 3, 4, 5, 6, 7, 8 or even more cameras, for example, 10.

Each camera of the camera array 105 has a field of view (fov). The field of view (fov) of each camera in the camera array 105 may be substantially the same. The combined field of view cameras of the camera array may be called as overall field of view (OFOV). The overall field of view may be changeable with adaptive lenses or the array of adaptive lenses. When cameras of the camera array 105 are pointed at an object to be imaged, each camera captures a substantially similar image of the object, i.e. the image of each camera is similarly framed. In this example embodiment, cameras of the camera array 105 are integrated to the apparatus 100, but it is also possible that the camera array comprising at least two cameras is a separate device that is at least electrically connected to the apparatus.

It is also possible that at least one of the cameras of the camera array 105 may be removed from the apparatus 100 (and from the array 105) physically or programmatically by using software i.e. turning one or more cameras off. Further one or more cameras of the camera array 105 may be added to the apparatus 100 (and the array 105) physically or programmatically by using software i.e. turning one or more cameras on. Cameras of the camera array 105 work together thus enable capturing different type of images, for example, images with different field of views such as panorama images and other wide-field images etc.

The apparatus 100 may also comprise an interface means (not shown), e.g. a user interface, which allows a user to interact with the apparatus 100 and cameras of the camera array 105. The user interface means may be implemented by using one or more of the following: the display, a touch screen, a keypad 106, or other structures.

The apparatus 100 may further be configured to connect to another device e.g. by a communication means i.e. a communication block (not shown), to receive and/or transmit information.

The apparatus 100 may be conventional inflexible device with a flexible adaptive camera array or connected to a flexible adaptive camera array or the apparatus 100 may be a flexible device equipped with an adaptive camera array comprising cameras. By the apparatus 100 it possible to calculate the preferred camera pose for each camera i.e. determine a bent angle between adjacent cameras in the camera array 105 and/or select one or more cameras of the camera array 105 arranged to be used during capturing desired scenes or objects. The apparatus 100 may further comprise bending means for bending the camera array 105. The bending means may be for example a motor or other corresponding means.

Figure 2:
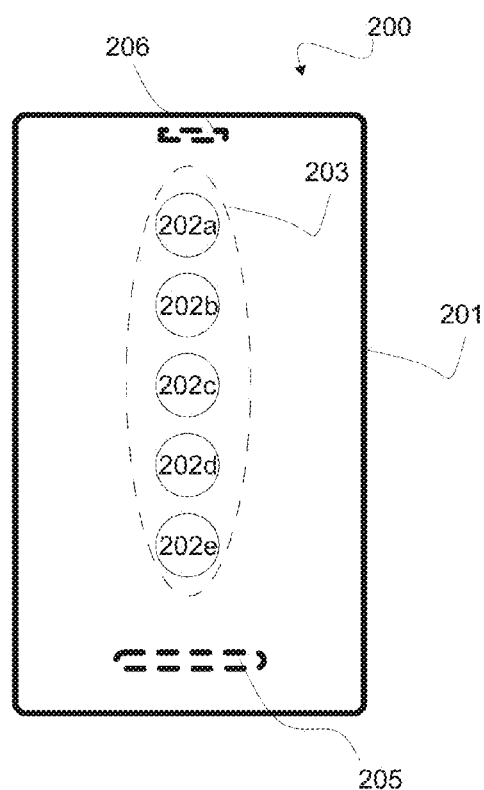
FIG. 2 shows an apparatus according to an example embodiment.

FIG. 2 shows an apparatus 200 according to an example embodiment. FIG. 2 shows a layout of the backside of the apparatus 200. The apparatus 200 is a smart phone, but it may as well be any other suitable mobile device comprising a camera array, for example, a mobile phone, a camera device, a smart camera device, a tablet device. Embodiments of the invention may also be implemented within any other electronic device or apparatus such as a gorillapod device comprising suitable camera means. It should be understood, however, that the apparatus 200 as illustrated and hereinafter described is again merely illustrative of one type of device that may benefit from various embodiments, and therefore should not be taken to limit the scope of the embodiments. As such, it should be appreciated that at least some of the components described below in connection with the apparatus 200 may be optional and thus, in an example embodiment may include more, less or different components than those described in connection with the example embodiment of FIG. 2.

The apparatus 200 shown in FIG. 2 comprises a housing 201 for incorporating and protecting the apparatus. The apparatus 200 is equipped with an adaptive camera array 203 comprising five cameras 202a-e. In FIG. 2 is shown the initial camera pose for cameras 202a-e of the camera array 203 without bending i.e. the camera array 203 comprising the cameras 202a-e is not bent. The apparatus 200 may further comprise a display, for example, in the form of e.g. a liquid crystal display. In other embodiments of the invention, the display may be any suitable display technology suitable to display, for example, a still image or video data, for example, image or video data captured by the apparatus 200. The apparatus 200 may further comprise a keypad, touchscreen, or other data input means. In other embodiments of the invention any suitable data or user interface mechanism may be employed. For example, the user interface may be implemented as a virtual keyboard or data entry system as part of a touch-sensitive display. The apparatus 200 according to an embodiment may also comprise communication means, for example, an infrared port for short range line of sight communication to other devices. In other embodiments, the apparatus 200 may further comprise telecommunication means, in addition to communication means, suitable for forming a phone connection to other device(s). In other embodiments, the apparatus 200 may further comprise any suitable short range communication solution such as, for example, a Bluetooth wireless connection, Near Field Communication (NFC) connection or a USB/firewire wired connection (not shown). The apparatus 200 may further comprise an audio input means 205 and an audio output means 206, which in embodiments of the invention may be any one of: an earpiece, a speaker of an analogue audio or analogue output connection or digital audio output connection suitable to produce audio signal, for example, audio part of video image. The apparatus 200 may further comprise bending means for bending the camera array 203. The bending means may be, for example, a motor or other corresponding means.

Figure 3:
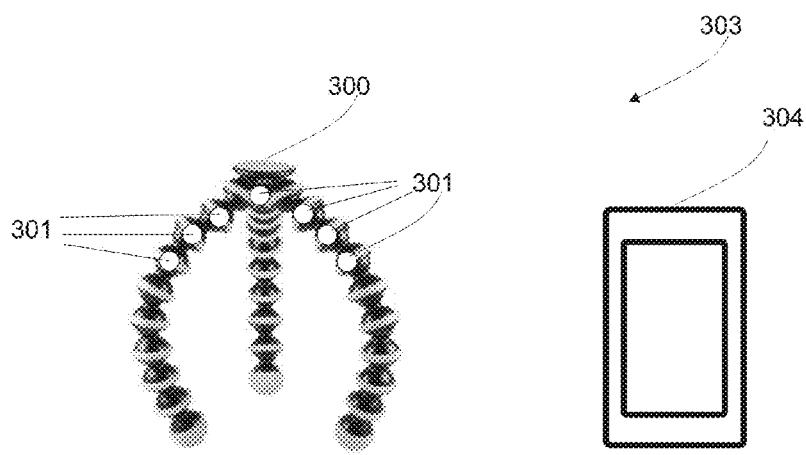
FIG. 3 shows an adaptive camera array device according to an example embodiment.

FIG. 3 shows an adaptive camera array device according to an example embodiment. The device 300 is a gorillapod device comprising a camera array with seven cameras 301 forming a camera array. The number of cameras may be arranged larger or smaller. The device 300 may be a part of a system 303 comprising another device in addition to the device 300. For example, the device 300 may be connected to a mobile device 304 via communication means suitable for forming a connection to other device(s). The communication means may be, for example, any suitable short range communication solution such as, for example, a Bluetooth wireless connection, Near Field Communication (NFC) connection or a USB/firewire wired connection. The device 300 is bendable. The mobile device 304 may then contain required electronics and circuitry, for example, for performing a camera pose determining method, size and depth determining method or a required number of cameras determining method according to embodiments of the invention. However, it is also possible that the gorillapod device 300 contains required electronics and circuitry, for example, for performing a camera pose determining method, size and depth determining method or a camera number determining method according to embodiments of the invention. Therefore, pose of one or more cameras 301 may be determined and adjusted by the system that automatically bends the device 300 in a particular way in order to enable photographing of objects or scenes as desired. In other words, the mobile device 304 or the gorillapod device 300 may automatically calculate the preferred camera pose for each camera 301 in the camera array, and the gorillapod device 300 may be bent by the system or a user so that each camera 301 in the array is posed to cover the required view of the view to be imaged with equal distribution. In addition, one or more cameras 301 can be removed or added on the basis of the desired image type arranged to be captured, for example, field of view (FOV) of image/video that a user desires to shoot. Either physical removal/addition of cameras or smart selection of turning on/off i.e. activating/ inactivating one or more cameras 301 are possible. In other words, during capturing a scene or an object(s) with a device equipped with an adaptive camera array, the system may automatically determine the minimum number of cameras arranged to be used for capturing the scene or object(s).

Figure 4:
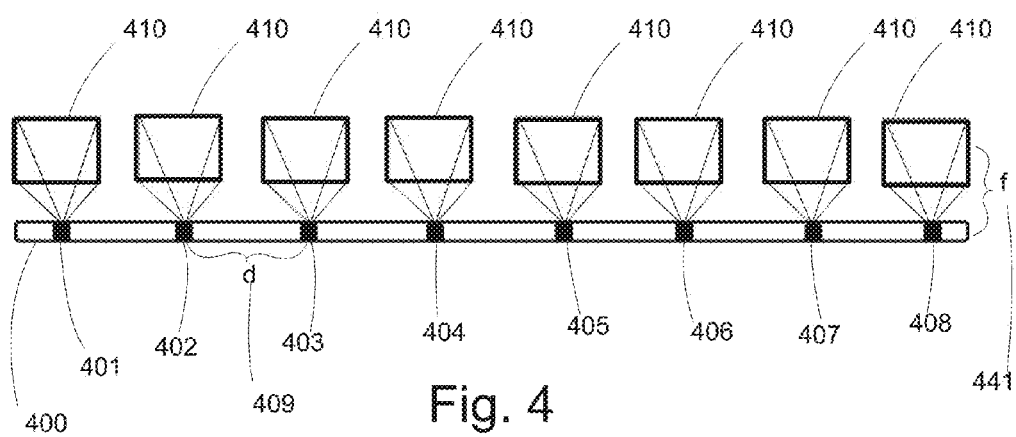
FIG. 4 shows an adaptive camera array according to an example embodiment.

FIG. 4 shows an adaptive camera array according to an example embodiment. The camera array 400 comprises eight parallel cameras 401-408. The FIG. 4 also discloses some camera parameters. It is shown the initial distance d 409 between two adjacent cameras, wherein the distance d may be constant between adjacent cameras in non-bent state. Further, there is shown a field of view (fov) 410 and a focal length (f) 411 of cameras 401-408. The camera array 400 may be flexible, in FIG. 4, the camera array 400 is in its initial camera pose without bending. The camera array 400 may be automatically bent by a camera adjusting system into which the camera array arrangement 400 may be connected as a separate device or as an integrated part.

Figure 5:
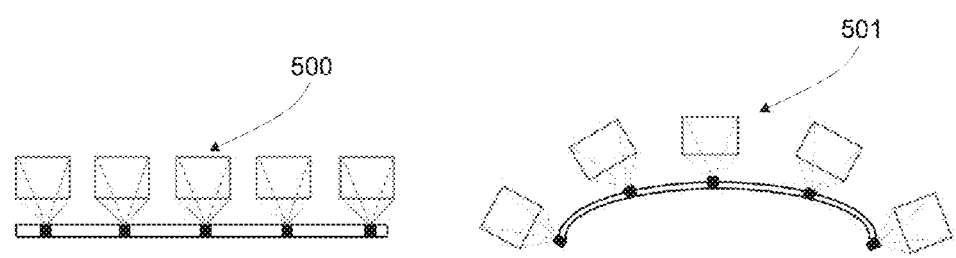
FIG. 5 shows an adaptive camera array according to an example embodiment.

FIG. 5 shows an adaptive camera array with 5 cameras in an initial (unbent) state 500 and in a bent state 501 according to an example embodiment. The system, after determination of suitable camera poses (required bending of the camera array), has automatically bent (e.g. by a motor) or guided user (e.g. user bending) to arrange bending of the camera array as required. Suitable camera poses may depend on desired image type to be captured and number of cameras arranged to be used, distance between cameras, a flow of cameras and/or a focal length of cameras. In the bent state 501, the camera array may be used for capturing panorama images or other wide range images and even panorama videos or other wide range videos, without turning the camera array while shooting. An example of determination method suitable to be used for determining camera poses is shown in FIG. 6.

Figure 6:
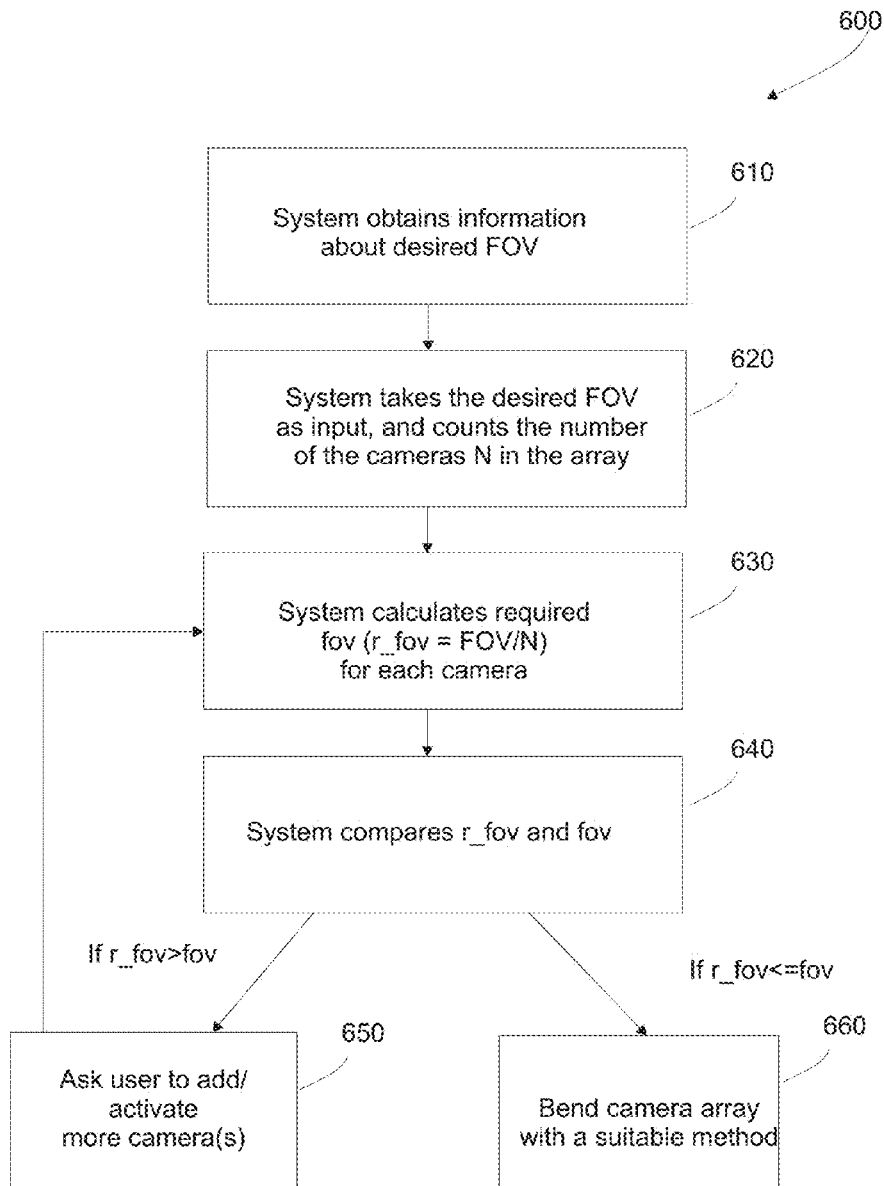
FIG. 6 shows a flow chart of camera pose determining method for an adaptive camera array according to an example embodiment.

FIG. 6 shows a flow chart of a method 600 suitable to be used for determining camera poses for cameras of an adaptive camera array for a specific field of view according to an example embodiment. The system comprising the adaptive camera array is arranged to determine, for example, calculate preferred camera poses for each camera in the camera array in order to enable capturing of the specific field of view by the cameras. Camera parameters of each camera in the camera array, e.g. focal length (f), field of view (fov), and the initial distance (d) between two cameras are known, for example, predetermined for the system.

In the method 600, in step 610 the system obtains a desired field of view (FOV) of image/video that a user wants to capture as a user input. The desired FOV may determine view of image/video that the cameras are arranged to capture. The obtained desired FOV may be, for example, "180 degree panorama". In step 620, for the desired FOV (e.g. 180 degree), the system calculates the preferred camera pose for each camera based on the number of the cameras of the adaptive array and the desired field of view (FOV). In other words, the system takes the desired FOV as an input, and it determines, for example, counts (if already not known) the number N of the cameras in the array or number of active cameras in the array. The known fixed field-of-view of each camera is fov. In step 630, the system determines, for example, calculates, the average field-of-view r_fov equal to FOV/N for each camera, wherein r_fov is the required part of FOV, which each camera of the array should cover. In step 640, the system compares fov and r_fov. If fov less than r_fov, the FOV cannot be covered with these N cameras in the array. Therefore, one or more cameras need to be added into the array until fov greater than or equal to r_fov. The method continues to step 650, wherein user is asked to activate more cameras to the array or the system activates cameras itself. Activating may in this context mean that camera is turned on or it is physically added to the array. After at least one camera is activated, the method returns back to step 630. And when the systems determines in step 640 that fov>=r_fov, the method continues to step 660. In step 660 the adaptive camera array is bent with a suitable method (e.g. user bends the array, or the system, for example, by a motor bends the array or the material of array may be bendable smart material, so that each camera in the array is in required pose so that their field of views together cover the desired FOV with equal distribution. In other words, the array is bent to arrange the bend angle between each two adjacent camera sensors in the array to achieve the desired FOV. Bendable smart material may either be a monolithic flexible material which can bend, or a set of non-bendable modules connected via bendable material. The bending could be based on materials/metals with memory.

Figure 7:
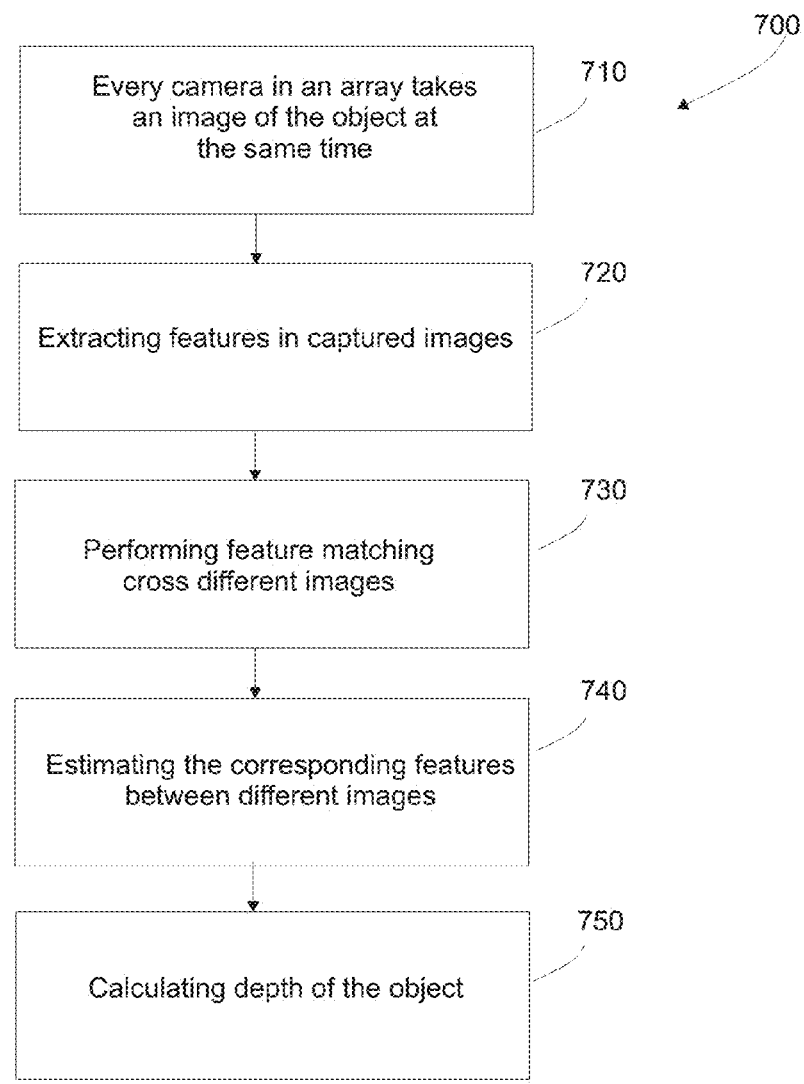
FIG. 7 shows a flow chart of a size of an object and depth determining method of an adaptive camera array according to an example embodiment.
Figure 8A:
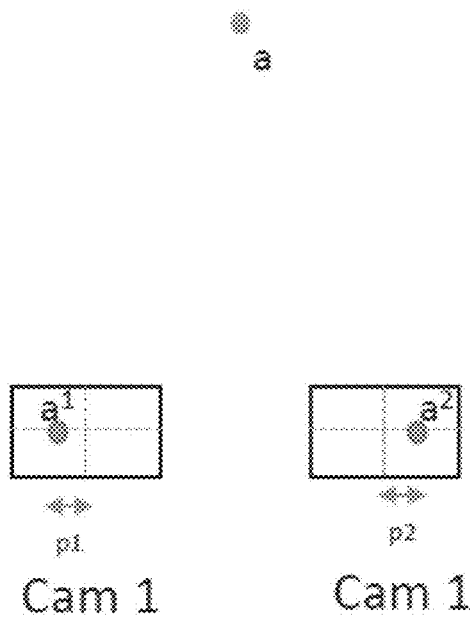
FIG. 8a shows an explanation for step 740 of FIG. 7 according to an embodiment.
Figure 8B:
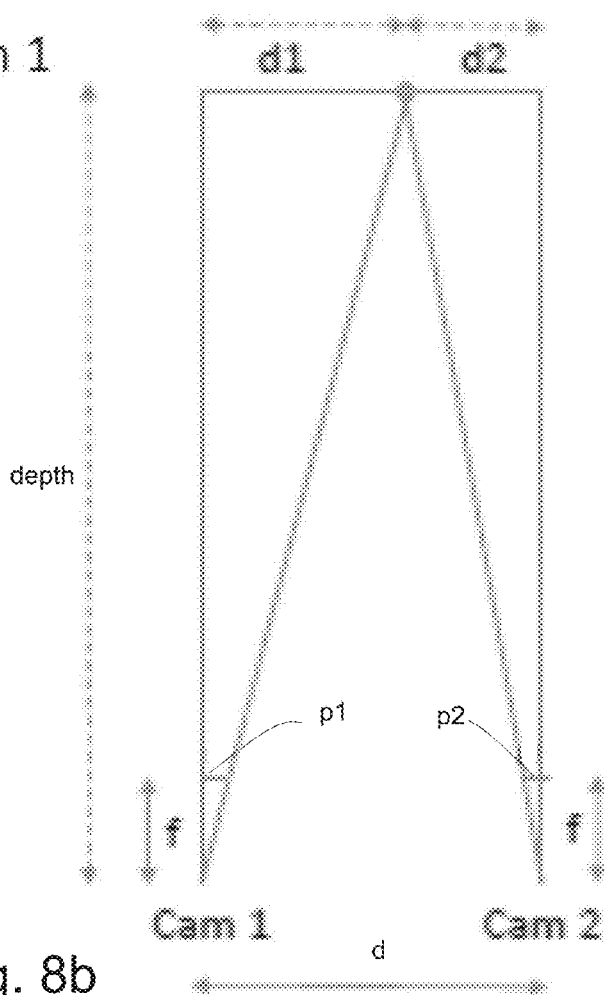
FIG. 8b shows an explanation for step 750 of FIG. 7 according to an embodiment.

FIG. 7 shows a flow chart of a method 700 for determining size of an object and depth measurement of the object by cameras of an adaptive camera array according to an example embodiment. The steps of the method may be performed by the adaptive camera array itself or a system comprising the camera array. In the method 700, in step 710 every camera in the array captures an image of the object at the same time. In step 720, image features are extracted in every image by suitable feature detector(s), for example, by Scale-Invariant Feature Transform (SIFT) feature detector(s), Speeded-Up Robust Features (SURF) detector(s), or by any other suitable feature detector(s). In step 730, pairwise feature matching is performed cross different captured images in order to find the corresponding features between captured images. Pairwise feature matching is performed between each pair of images. In step 740, corresponding features between captured images are estimated. Corresponding image features from different cameras may be estimated by Euclidean distance, so that, corresponding projections a1 and a2 of an object "a" are found. Since the size of the camera's image sensors are known, parallax for the projections a1 and a2 may be calculated, parallax of a1 is p1 and parallax of a2 is p2. An explanation for step 740 according to an embodiment is shown in FIG. 8b. In step 750, since the initial distance (d) between two cameras, focal length (f) of cameras, parallax of a1 (p1) and parallax of a2 (p2) are known, depth of the object a may be calculated, as follows:

$$depth = \frac{f * d}{p1 + p2}$$

Once t is calculated, d1 and d2 may be calculated as:

$$d1 = \frac{depth * p1}{f}$$

$$d2 = \frac{depth * p2}{f}$$

Therefore, if two points of the object are visible in both cameras, the real distance of the two points can be calculated. By this principle, if the points from the objects boundary are visible in both cameras, the size of the object can be calculated. An explanation for step 750 according to an embodiment is shown in FIG. 8c.

Figure 8C:
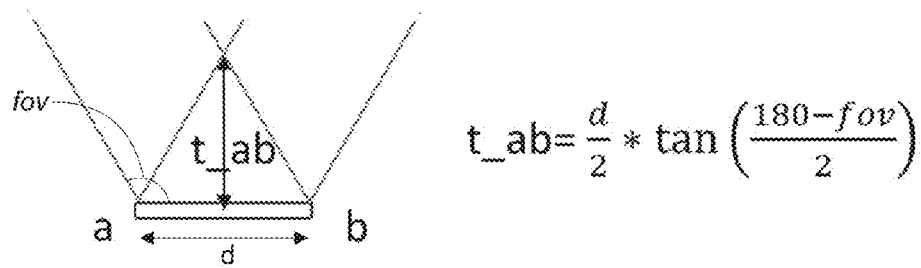
FIG. 8c shows a structure from motion method algorithm according to an example embodiment.

FIG. 8c shows a structure from motion method algorithm according to an example embodiment. This method may be used for calculating depth and size of the object in a local scale i.e. size in the images. For each camera in the adaptive camera array, the camera parameters, e.g. focal length (f), field of view (fov), and the initial distance (d) between two cameras are known. For camera a 810 and camera b 820 in a camera array 830 the minimum depth t_ab for an object 840 to be captured by using camera a and camera b may be calculated by formula 850 t_ab=d/2*tan((180−fov)/2).

Figure 9:
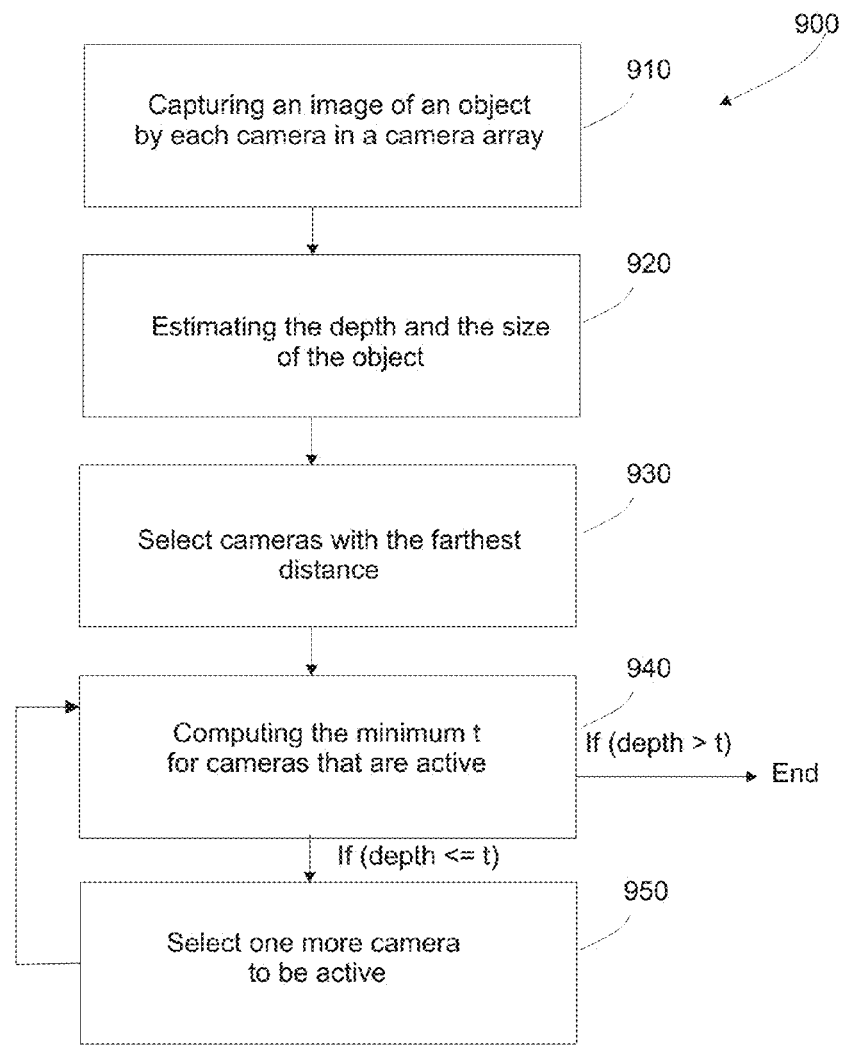
FIG. 9 shows a flow chart of a required number of cameras determining method according to an example embodiment.
Figure 10A:
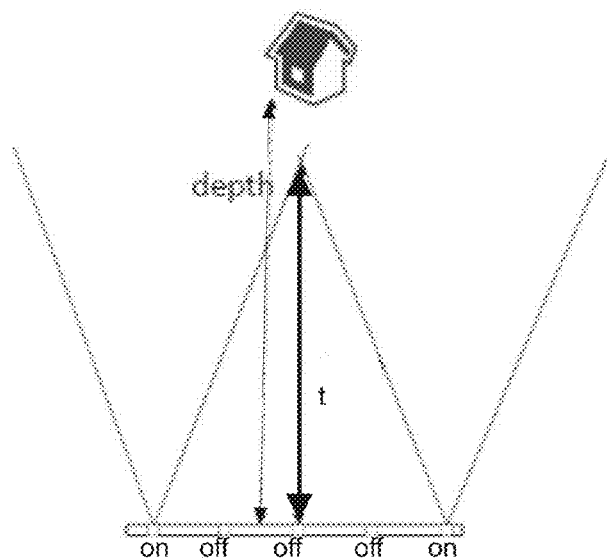
FIGS. 10a,b,c show examples of situation indicating effect of active cameras to gained field of view by an adaptive camera array according to an example embodiment.
Figure 10B:
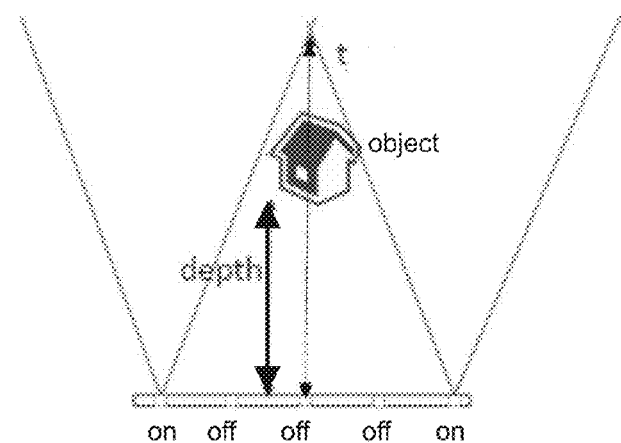

If an object or a scene is arranged to be captured by an adaptive camera array of a device in certain settings, the device automatically calculates the depth of the object from each camera, and based on the object's size and position the device may determine whether there are redundant cameras in camera array. The flow chart of a required number of cameras determining method 900 according to an example embodiment is shown in FIG. 9. In step 910, an image of an object is captured by each camera in an adaptive camera array. In step 920, the depth and the size of the object is estimated/determined for the object. In step 930, cameras with the farthest distance in the array, for example, cameras 401 and 408 of FIG. 4, are selected. They are selected to be active cameras for imaging. In step 930, the minimum t (t=d/2*tan((180−fov)/2)) for active cameras is determined. If t less than or equal to depth (an example of this situation is shown in FIG. 10a), currently active cameras are sufficient to cover the object and no more cameras need to be activated/turned on. Whereas, if t greater than depth (an example of this situation is shown in FIG. 10b), the currently active cameras are not sufficient to cover the object, and the method continues to step 950, and at least one more camera is activated/turned on (by user or automatically by a device), for example, camera 402, 403, 404, 405, 406, or 407 of FIG. 4. The camera to be activated may be, for example, in the middle or at least between the cameras with the farthest distance in the array.

Figure 10C:
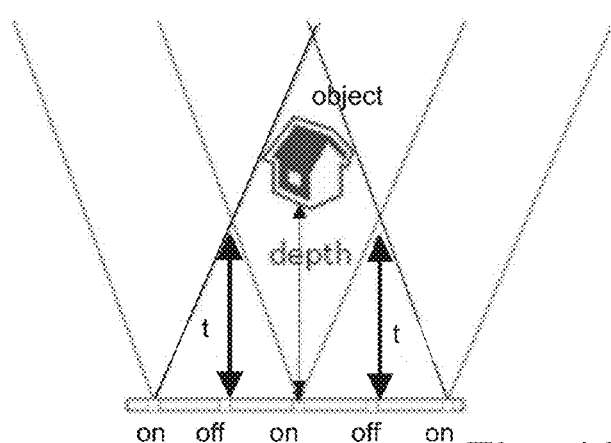

The method continues from step 950 to step 940 until t less than or equal to depth. An example of a situation with three active cameras is shown in FIG. 10c.

Figure 11:
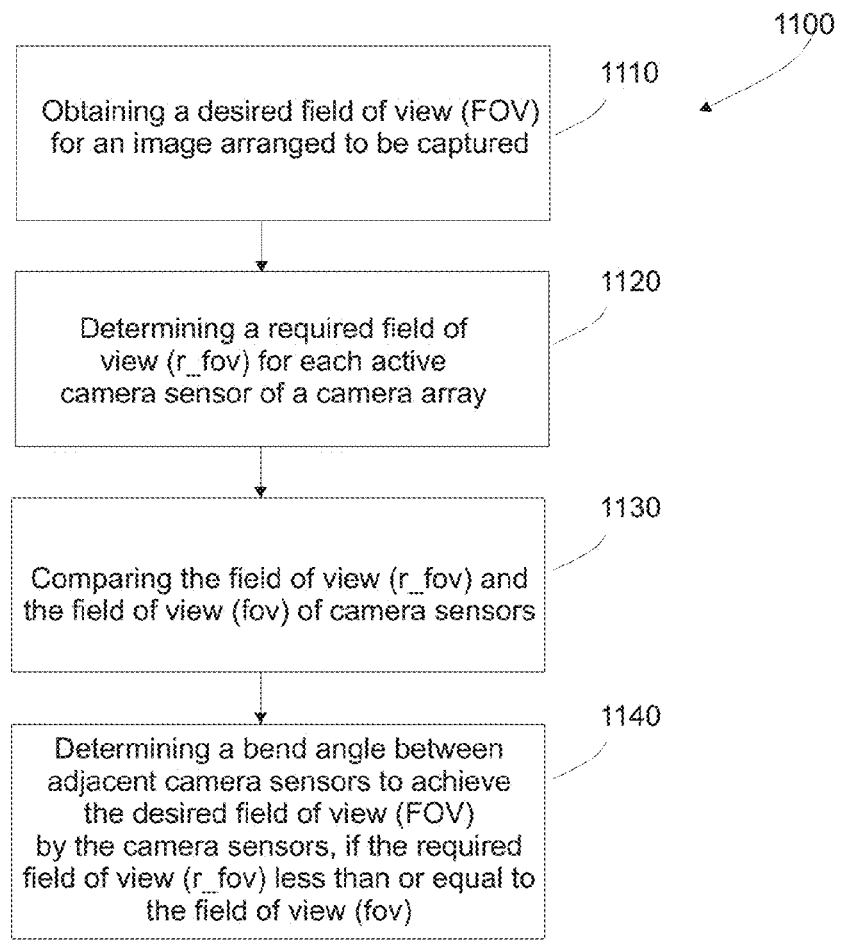
FIG. 11 shows a flow chart of method for calculating desired camera pose for each camera in an adaptive camera array according to an example embodiment.

FIG. 11 shows a method shows a flow chart of method for calculating desired camera pose for each camera in an adaptive camera array according to an example embodiment. In the method 1100, in step 1110 a desired field of view (FOV) for an image arranged to be captured is obtained. In step 1120 a required field of view (r_fov) of the desired field of view (FOV) is determined for each active camera sensor of a camera array comprising at least two active camera sensors having a field of view (fov), wherein the required field of view is determined by dividing the desired field of view (FOV) by the number of active camera sensors. In step 1130 the field of view (r_fov) and the field of view (fov) of camera sensors are compared. In step 1140 a bend angle between adjacent camera sensors are determined to achieve the desired field of view (FOV) by camera sensors of the camera sensor array, if the required field of view (r_fov) less than or equal to the field of view (fov).

The various embodiments may provide advantages. According to an embodiment a mobile device which is equipped with an adaptive camera array comprising multiple cameras may be used for capturing, for example, panorama or wide-angle image(s) at once i.e. by pressing the shutter button only once without several presses of the shutter button and rotation of the device between subsequent image frames (and presses of the shutter button). Same device may also be used for panorama video shooting. In addition, according to another embodiment an adaptive camera array device/system may select only a necessary amount of cameras for capturing images, therefore reducing the use of redundant camera(s) and data. The invention provides an adaptive camera array mobile device which is applicable in scenarios where, using a viewfinder is not feasible, but suitable camera configuration can be achieved without fully manual control. In addition, because the device equipped with an adaptive camera array according to an embodiment of the invention is suitable to arrange automatic bending of the camera array in panorama or wide-angle imaging or select only required i.e. sufficient number of cameras for capturing image of a certain object/scene, the amount of data transmission may be lower. In addition, due to automatic function i.e. automatic bending or automatic selection of camera number, the device equipped with ab adaptive camera array is also suitable to be used in remote operation and even with low bitrate connectivity.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
    obtaining a desired field of view for an image arranged to be captured,
    determining a required field of view of the desired field of view for each active camera sensor of a camera sensor array comprising at least two active camera sensors having a field of view, wherein the required field of view is determined by dividing the desired field of view by a number of active camera sensors
    comparing the required field of view and the field of view of the at least two active camera sensors; and
    determining a bend angle between adjacent camera sensors from among the at least two active camera sensors to achieve the desired field of view by the at least two active camera sensors of the camera sensor array, if the required field of view less than or equal to the field of view of the at least two active camera sensors.

2. The method according to claim 1, further comprising:
    bending the camera sensor array automatically to obtain the determined bend angle between the adjacent camera sensors to achieve the desired field of view by the at least two active camera sensors.

3. The method according to claim 1, further comprising:
    activating at least one additional camera sensor, if required field of view is greater than field of view of the at least two active camera sensors; and
    performing the determining and the comparing based on the number of active camera sensors.

4. The method according to claim 1, wherein the desired field of view is obtained as a user input.

5. The method according to claim 1, wherein the camera sensor array is flexible.

6. The method according to claim 1, wherein the image is one of a still image and video image data.

7. An apparatus comprising a flexible camera sensor array comprising at least two active camera sensors having a field of view, at least one processor, memory including computer program code, the memory and the computer program code configured to, with the at least one processor, cause the apparatus to perform at least the following:
    obtain a desired field of view for an image arranged to be captured by said at least two active camera sensors;
    determine a required field of view of the desired field of view for each active camera sensor, wherein the required field of view is determined by dividing the desired field of view by a number of active camera sensors;
    compare the required field of view and a field of view of the at least two active camera sensors; and
    determine a bend angle between adjacent camera sensors from among the at least two active camera sensors to achieve the desired field of view by the at least two active camera sensors of the camera sensor array, if the required field of view<=the field of view of the at least two active camera sensors.

8. The apparatus according to claim 7, wherein the apparatus is further caused to:
    bend the camera sensor array automatically to obtain the determined bend angle between the adjacent camera sensors to achieve the desired field of view by the at least two active camera sensors.

9. The apparatus according to claim 7, wherein the apparatus is further caused to:
    activate at least one camera sensors, if required field of view>field of view of the at least two active camera sensors; and
    perform the determining and the comparing based on the number of active camera sensors.

10. The apparatus according to claim 9, wherein the at least one additional camera sensor is activated automatically by turning the at least one camera sensor on in the camera sensor array.

11. The apparatus according to claim 7, wherein the desired field of view is obtained as a user input.

12. The apparatus according to claim 7, wherein the desired field of view is a wide angle view.

13. The apparatus according to claim 7, wherein the camera sensor array is flexible.

14. The apparatus according to claim 7, wherein the apparatus is a mobile device.

15. A computer program product embodied on a non-transitory computer readable medium, comprising computer program code configured to, when executed on at least one processor, cause an apparatus to:
    obtain a desired field of view for an image arranged to be captured by at least two active camera sensors;
    determine a required field of view of the desired field of view for each active camera sensor of the at least two active camera sensors, wherein the required field of view is determined by dividing the desired field of view by a number of active camera sensors from among the at least two active camera sensors;
    compare the required field of view and a field of view of the at least two active camera sensors; and
    determine a bend angle between adjacent camera sensors from among the at least two active camera sensors to achieve the desired field of view by the at least two camera sensors of the camera sensor array, if the required field of view<=the field of view of the at least two active camera sensors.

16. The computer program product according to claim 15, wherein the apparatus is further caused to:
    bend the camera sensor array automatically to obtain the determined bend angle between the adjacent camera sensors to achieve the desired field of view by the at least two active camera sensors.

17. The computer program product according to claim 15, wherein the apparatus is further caused to:
    activate at least one additional camera sensor, if required field of view>field of view of the at least two active camera sensors; and
    perform the determining and the comparing based on the number of active camera sensors.

18. The computer program product according to claim 17, wherein the at least one additional camera sensor is activated automatically by turning the at least additional one camera sensor on in the camera sensor array.

* * * * *